US006659349B1

(12) United States Patent
Weber et al.

(10) Patent No.: US 6,659,349 B1
(45) Date of Patent: *Dec. 9, 2003

(54) DEVICE FOR IDENTIFYING OBJECTS

(75) Inventors: Wolfgang Weber, Hemau (DE);
Manfred Bachhuber, Abensberg (DE)

(73) Assignee: Bayerische Motoren Werke Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 880 days.

(21) Appl. No.: 08/823,183

(22) Filed: Mar. 24, 1997

(30) Foreign Application Priority Data

Mar. 23, 1996 (DE) .......................... 196 11 579

(51) Int. Cl.⁷ ................................. G06K 7/10
(52) U.S. Cl. ..................................... 235/459
(58) Field of Search ................ 235/475, 462, 235/459

(56) References Cited

U.S. PATENT DOCUMENTS

| 4,332,012 A | * | 5/1982 | Sekine et al. | |
| 4,644,143 A | * | 2/1987 | McJohnson et al. | ........ 235/385 |
| 4,770,122 A | | 9/1988 | Ichihashi et al. | |
| 4,837,904 A | * | 6/1989 | Abe et al. | ................... 235/487 |
| 4,947,335 A | | 8/1990 | Blitchington | |
| 5,083,591 A | * | 1/1992 | Edwards et al. | |
| 5,252,814 A | * | 10/1993 | Tooley | |
| 5,321,619 A | | 6/1994 | Matsuda et al. | |
| 5,347,463 A | * | 9/1994 | Nakamura et al. | ..... 364/478.14 |
| 5,406,060 A | | 4/1995 | Gitin | .......................... 235/462 |

FOREIGN PATENT DOCUMENTS

DE   26 29 071   1/1978

OTHER PUBLICATIONS

Roger C. Palmer, The Bar Code Book, 1995, Helmers Publishing, pp. 117–121 and 123–129.*
European Search Report and translation thereof.
*Elektronik* Sep. 1993 entitled "Identifikation als Information" by U. Naudascher, pp. 78–84.
*Technische Rundschau* 30/31, 85 entitled Mustererkennung in der industriellen Anwendung by Von Eckart Hundt et al., pp. 14–21.

* cited by examiner

Primary Examiner—Mark Tremblay
(74) Attorney, Agent, or Firm—Crowell & Moring LLP

(57) ABSTRACT

In a device for identifying objects resting on a carrier that are being moved along a conveyor line by a conveyor system and which undergo various processing steps along the conveyor line, with a marking carrier connected to the object and with a fixed reading device for the marking carrier, the marking carrier is attached to the carrier and the reading device is located below the conveyor line.

22 Claims, 1 Drawing Sheet

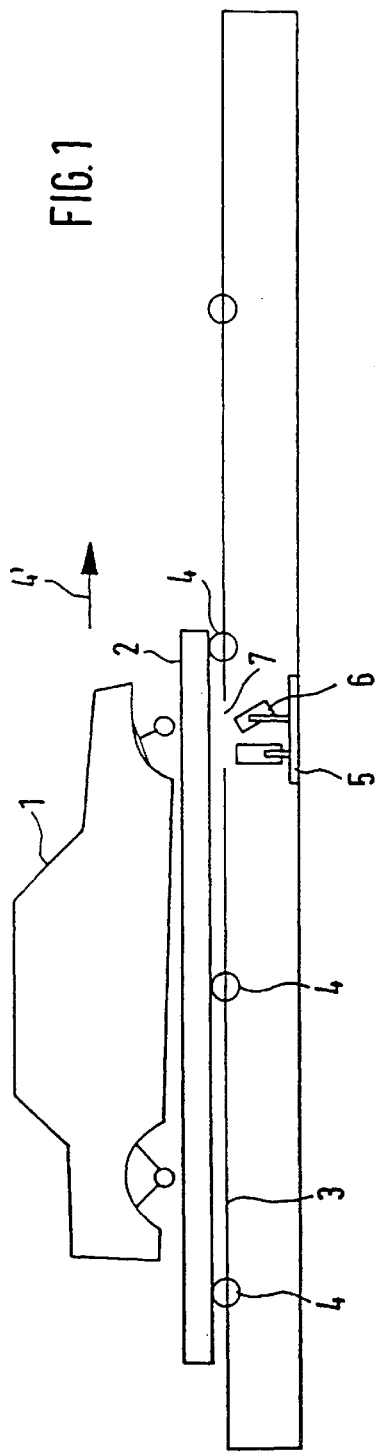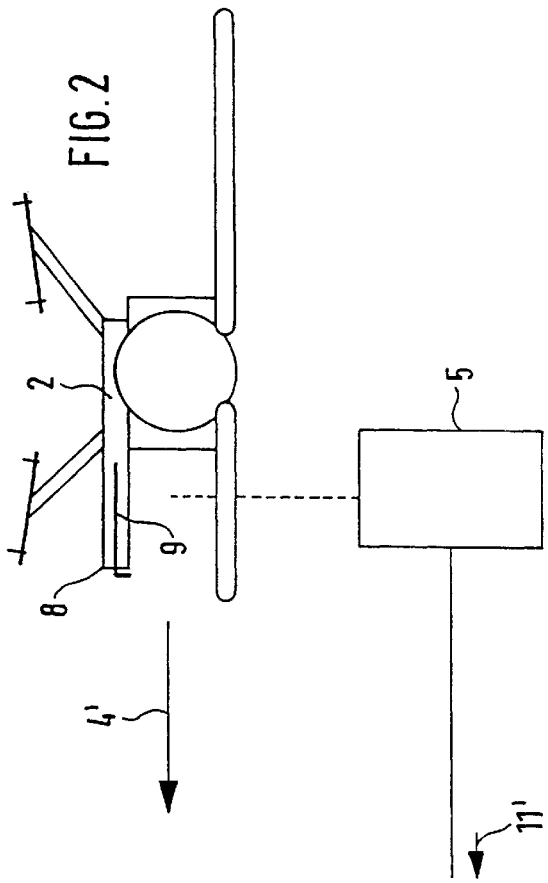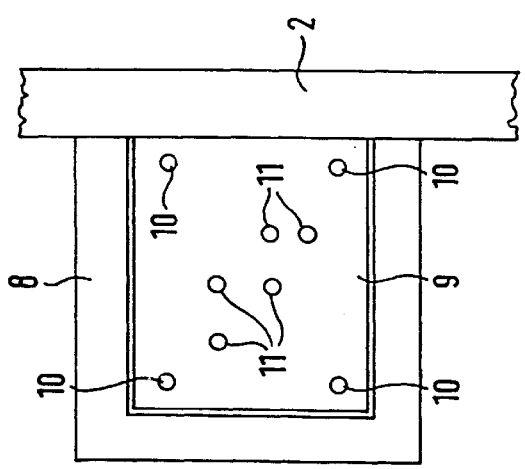

DEVICE FOR IDENTIFYING OBJECTS

BACKGROUND AND SUMMARY OF THE INVENTION

This application claims the priority of German Application No. 196 11 579.5, the disclosure of which is expressly incorporated by reference herein.

The invention relates to a device for identifying objects and, more particularly, to a device for identifying objects resting on a carrier that are moved along a conveyor line by a conveyor and which undergo various machining processes along the conveyor line. A marking carrier is connected with the object and a fixed reading device is provided for the marking carrier.

It is known, for example, to hang a marking carrier in a vehicle body during the manufacture of a vehicle. The vehicle body passes through various painting processes. These painting processes also involve dipping the vehicle body completely in paint baths. The painting processes are followed by drying processes in which the vehicle body is heated to temperatures of 180° C. for example.

The handling of the marking carrier in the known device is cumbersome since the marking carrier must be hung in place before the paint treatment and must then be removed from the vehicle again. There is also the risk of twisting, so that it is no longer, or not readily, possible for a reading device to identify the marking carrier. Finally, the reading device is also located in the work area. The line of sight between the marking carrier and the reading device can be broken by objects in the visual field of the reading device. Since as a rule several reading devices are used during the various processing steps, which then might possibly be completely or partially ineffective as a result, there is the risk of an insufficient monitoring of the respective vehicle throughout the entire processing chain.

There is therefore needed a device of the above-mentioned type or identifying objects that permits reliable recognition of the marking carrier in a manner that is simple in design and straightforward in performance.

The present invention meets these needs by a device for identifying objects and, more particularly, to a device for identifying objects resting on a carrier that are moved along a conveyor line by a conveyor and which undergo various machining processes along the conveyor line. A marking carrier is connected with the object and a fixed reading device is provided for the marking carrier. The marking carrier is mounted on the carrier and the reading device is located below the conveyor line.

By placing the reading device at the bottom of the conveyor line, the risk of inadvertent interruption of the line of sight between the marking carrier and the reading device is eliminated. At the same time, the rigid mounting of the marking carrier on the carrier permits correct visual orientation with respect to the reading device. The permanent connection with the carrier makes special handling of the marking carrier superfluous. Instead, the marking carrier always moves with the carrier and is also subjected, together with the carrier, to subsequent treatment, in the form of paint removal for example. Of course, a marking carrier of this kind must be especially mechanically strong.

The reading device can be, for example, a camera with an image processing device connected thereto. Alternatively, a bar code reader can be used, provided the marking carrier is provided with a bar code.

The use of a camera is advantageous if the marking carrier is made in an especially simple fashion out of sheet metal that is provided with a punched code. The image processing device is then designed as a conventional decoding device, for a punched code produced by a standard method for example.

To improve the optical scanning of the marking carrier, an illuminating device for the marking carrier can also be located below the conveyor line. The illuminating device can be switched on constantly or only when the marking carrier is in the vicinity.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic representation of a device according to the present invention;

FIG. 2 is a cross-sectional view taken through FIG. 1; and

FIG. 3 is a detailed diagram of the device in FIGS. 1 and 2 according to the present invention.

DETAILED DESCRIPTION OF THE DRAWINGS

Within the framework of a manufacturing device for a vehicle, a body 1 is located on a carrier 2. The carrier 2 is moved along a movement path by a conveying system, for example a chain conveyor 3, in the direction of arrow 4'. The mechanical link between the carrier 2 and the chain conveyor 3 is provided by cross members 4 located below the carrier 2.

A camera 5 as well as an associated illuminating device 6 are located below the movement path of the chain conveyor 3. The camera 5 serves as a reading device and has an image processing device arranged downstream. Both the camera 5 and illuminating device 6 are aimed at the underside of the carrier 2. Below the conveyor line is a glass portion 7 through which a visual link can be created between the camera 5 and a marking carrier (see FIGS. 2 and 3).

As shown in detail in FIG. 2, a holder 8 (see FIG. 3) is located on the end of the carrier 2, in which holder 8 a marking carrier in the form of a piece of sheet metal 9 provided with a punched code is located. The punched code consists of four holes 10 located at the corners as well as holes 11 located within the area formed by the four holes 10 to constitute a code. This hole pattern is picked-up with the aid of camera 5 and converted by a decoding system (image processing system) located downstream in a computer 11' into a four-digit number. This number is unique within the manufacturing process and characterizes the marking carrier 9 for identifying the vehicle body fastened to the carrier 2.

As the carrier 2 passes over the glass section 7, the hole pattern 10, 11 in the marking carrier 9 is picked up with the aid of the camera 5 and converted by a decoding device (such as the computer 11') into a series of four-digit numbers (ID number). When reading takes place for the first time in a reading device as shown in FIG. 1, a computer located downstream for controlling the manufacturing process assigns manufacturing data to the ID number. With each subsequent reading of marking carrier 9 via reading devices arranged further along in the path of motion as in FIG. 1, the computer knows where the individual vehicle body is located at any given moment and can perform appropriate control measures, for example to determine the path of movement of carrier 2. It is therefore possible at any time to determine the exact position of the vehicle body 1.

The holder 8 is rigidly connected with the carrier 2. During manufacture, the holder 8 is subjected to the same processing steps as the carrier 2. Because of its sturdiness and insensitivity, the marking carrier 9 does not suffer any wear. At the same time, it requires no special handling since it is mounted securely on the carrier 2. This produces a device for identifying objects, vehicle bodies in this case, that has a structure that is especially simple from a mechanical standpoint and can be used without wear even over long production times. No special maintenance is required. Instead of being used within the framework of vehicle manufacturing, it is also possible to identify in this fashion other objects that pass through a manufacturing system that has individual processing stations, such as color television tubes for example.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for identifying an object undergoing machining processes, the device comprising:
   a conveyor line;
   a carrier mechanically linked to and moved along the conveyor line, said object undergoing machining processes being located on the carrier;
   a marking carrier mounted on the carrier such that it is associated with the object;
   an optical imaging device located below said conveyor line; and
   a transparent plate arranged between the optical imaging device and the marking carrier, the optical imaging device being directed upwardly at the marking carrier mounted on the carrier to form a visual link through the transparent plate.

2. The device according to claim 1, further comprising an image processing device located downstream of said optical imaging device, wherein said optical imaging device is a camera.

3. The device according to claim 1, wherein said marking carrier is a piece of sheet metal provided with a punched code.

4. The device according to claim 2, wherein said marking carrier is a piece of sheet metal provided with a punched code.

5. The device according to claim 1, further comprising an illuminating device having an illuminating source which illuminates said marking carrier, said illuminating device being located below both the conveyor line and the transparent plate.

6. The device according to claim 2, further comprising an illuminating device having an illuminating source which illuminates said marking carrier, said illuminating device being located below both the conveyor line and the transparent plate.

7. The device according to claim 3, further comprising an illuminating device having an illuminating source which illuminates said marking carrier, said illuminating device being located below both the conveyor line and the transparent plate.

8. The device according to claim 4, further comprising an illuminating device having an illuminating source which illuminates said marking carrier, said illuminating device being located below both the conveyor line and the transparent plate.

9. An object identification device for a vehicle manufacturing system, the device comprising:
   a conveyor system;
   a carrier upon which an object to be identified rests, said carrier being mechanically linked to and moved on the conveyor system;
   a marking carrier mounted on said carrier and being associated with a vehicle body resting on said carrier;
   an optical imaging device arranged in a position below the conveyor system; and
   a transparent plate arranged between the optical imaging device and the marking carrier, the optical imaging device being directed upwardly at the marking carrier mounted on the carrier to form a visual link through the transparent plate.

10. The object identification device according to claim 9, further comprising a processor arranged downstream and coupled to said optical imaging device, wherein said optical imaging device is a camera providing image signals to said processing device.

11. The object identification device according to claim 10, wherein said marking carrier is a piece of sheet metal provided with a punched code.

12. The object identification device according to claim 11, further comprising an illumination source arranged below both said conveyor system and said transparent plate in a position to allow illumination of said marking carrier.

13. A motor vehicle manufacturing device, comprising:
    a conveyor system;
    a carrier mechanically linked to and movable on the conveying system, said carrier supporting a vehicle body which undergoes machining processes along the conveyor system;
    a marking carrier rigidly mounted on the carrier and being associated with the vehicle body supported on the carrier;
    a camera arranged in a position below the conveyor system;
    a glass plate arranged between the camera and the marking carrier, the camera being directed upwardly at the marking carrier through the glass plate to form a visual link for reading the marking carrier; and
    wherein the rigid mounting of the marking carrier on the carrier permits a correct visual orientation between the marking carrier and the camera.

14. A motor vehicle manufacturing plant, comprising a conveying system for vehicle manufacture and vehicle bodies moved along the conveying system, the plant further comprising:
    at least one carrier mechanically linked to the conveying system for moving along a movement path of the conveying system, said carrier supporting at least one of the vehicle bodies to be processed along the conveying system;
    a marking carrier rigidly mounted to the at least one carrier and being associated with the at least one vehicle body resting on the carrier;
    a camera arranged in a position below the conveying system; and
    a glass plate arranged between the camera and the marking carrier, the camera being directed upwardly at the marking carrier through the glass plate to form a visual link, said camera reading the marking carrier in order to identify the vehicle body.

15. The device according to claim 1, wherein the transparent plate is a glass plate.

16. The device according to claim 9, wherein the transparent plate is a glass plate.

17. The device according to claim 5, wherein the illumination source is switched on only when the marking carrier is within a defined area.

18. The object identification device according to claim 12, wherein the illumination source is switched on only when the marking carrier is within a defined area.

19. The motor vehicle manufacturing device according to claim 13, further comprising an illumination source arranged below the conveyor system and illuminating the marking carrier through the glass plate.

20. The motor vehicle manufacturing device according to claim 19, wherein the illumination source is switched on only when the marking carrier is within a defined area.

21. The motor vehicle manufacturing device according to claim 14, further comprising an illumination source arranged below the conveyor system and illuminating the marking carrier through the glass plate.

22. The motor vehicle manufacturing device according to claim 21, wherein the illumination source is switched on only when the marking carrier is within a defined area.

* * * * *